June 6, 1950 W. P. BOOTHROYD 2,510,167
PULSE GENERATOR AND STARTING CIRCUIT THEREFOR
Filed March 25, 1948
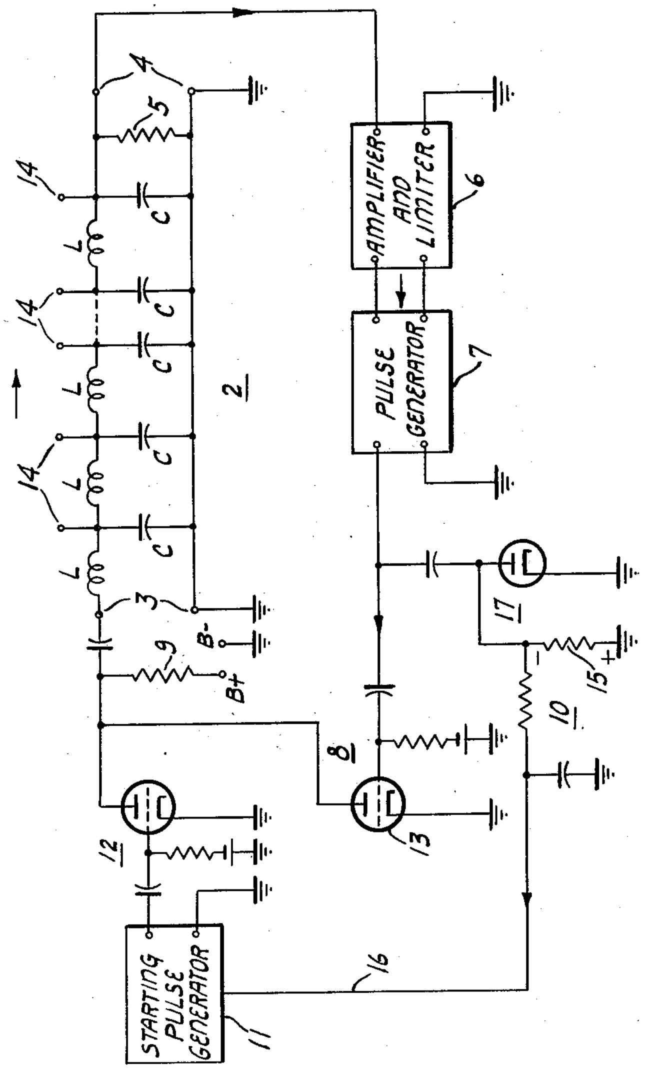
INVENTOR.
WILSON P. BOOTHROYD
BY
Brown, Denk & Lynnestvedt
AGENTS Patented June 6, 1950

2,510,167

UNITED STATES PATENT OFFICE 2,510,167

PULSE GENERATOR AND STARTING CIRCUIT THEREFOR

Wilson P. Boothroyd, Philadelphia, Pa., assignor to Philco Corporation, Philadelphia, Pa., a corporation of Pennsylvania Application March 25, 1948, Serial No. 16,912

4 Claims. (Cl. 250—36)

The invention herein described and claimed relates to pulse generators of the delay-line type, and more particularly to self-starting arrangements therefor.

Pulse generators of the general type described herein are frequently employed in multiplex pulse communication systems as a means for generating the trains of keying pulses which are utilized in selecting, sequentially, the various individual communication channels. A system typical of the prior art, and employing a delay-line type of keying pulse generator, is described, for example, in British Patent specification 587,939 of May 9, 1947.

The delay-line pulse generator disclosed in the above-identified British patent is both self-oscillatory and self-starting, its pulse repetition rate depending both on the time delay introduced by the delay line and on the time delay introduced by a relaxation oscillator which is coupled between the output and input terminals of the delay line.

In the pulse generator of the present invention, however, the pulse repetition rate may be determined almost entirely by the fixed constants of the delay line, and no relaxation oscillator, with all its inherent instability, need enter into the frequency-determining operation. While the advantages, in precision, of such a pulse generator are apparent, it is necessary to provide auxiliary means to start the generator automatically when it is first placed in operation or when it is stopped inadvertently by some external means. However it is essential that the starting mechanism shall not interfere with the normal or free-running operation of the system. A self-starting means has therefore been provided which is maintained inoperative during the time that the generator functions normally.

It is, accordingly, a principal object of the present invention to provide a self-starting arrangement for pulse generators of the delay-line type.

It is a further object of the invention to provide a starting means for pulse generators, which means is rendered incapable of affecting the operation of the generator during the normal operation thereof.

In accordance with a feature of the invention there is provided, in a pulse generating system, a delay line, said delay line having an overall time delay which is long compared to the time duration of the pulses generated by said system; means for generating starting pulses for initiating the operation of said system; means for applying said starting pulses to an input terminal of said delay line; means coupled to an output terminal of said delay line for deriving output pulses therefrom; means for applying said output pulses to an input terminal of said delay line, said pulses being applied in sufficient amplitude to ensure the sustained generation of time-spaced pulses by said system, the repetition rate of said last-named pulses being determined principally by the delay time of said line; and means responsive to the regular generation of pulses for preventing the continued application of starting pulses to said delay line.

These and other objects and features of the invention, and the manner in which they are attained, will appear from the following detailed description and accompanying drawing, the single figure of which is a schematic illustration of a pulse generator embodying the invention.

The pulse-rate-determining element of the delay-line pulse generator illustrated in the drawing is the delay line 2. The delay line is conventional and may comprise a plurality of series inductors L and shunt capacitors C. In the drawing, the input and output terminals are identified by the reference characters 3 and 4 respectively. To avoid reflections, the delay line may be terminated in an impedance 5 equal to the characteristic impedance of the line.

The output terminals 4 of the delay line 2 are coupled to the input terminals 3 of the line 2 by way of the amplifier and amplitude-limiter 6, the pulse generator 7, and the amplifier 8, the output load impedance 9 of the latter being connected across the input terminals 3 of the delay line 2. In general, the duration of the pulses generated by the system must be small compared to the time required for a pulse to traverse the line, so that the trailing edge of each pulse leaves the input terminals of the line before the leading edge of the same pulse reaches the output terminals of the line. A typical practical example is one wherein the pulse duration is 8 microseconds and the time required for a pulse to traverse the line is 125 microseconds.

The system also comprises the pulse rectifier circuit 17, filter 10, starting-pulse generator 11, and starting-pulse amplifier 12. These elements constitute the essence of the invention, but they will not be described until the normal operation of the system has been made clear.

In the normal operation of the system (as differentiated from the operation in starting), the pulses derived from the output terminals 4 of the delay line 2 are applied to the device 6 for amplification. The device 6 may also comprise means for limiting the amplitude of the pulses and, if desired, may include additionally a pulse differentiating means for producing a pulse of limited duration. The pulse derived from the output terminals of the device 6 is applied to a pulse generator 7 from whose output terminals may be derived a pulse of predetermined shape and amplitude. Devices of this type are well known in the art and detailed reference to such apparatus is deemed unnecessary. By way of example, however, the pulse generator 7 may comprise a pulse generating circuit of the type described in the H. W. Lord patent, No. 2,394,389, or, preferably, may comprise means for generating triangular pulses of predetermined amplitude of the type described in detail in my copending application Serial No. 14,691, filed March 13, 1948. The said copending application discloses but does not claim the present invention.

The pulse derived from the output terminals of the pulse generator 7 is applied to the input terminals 3 of the delay line 2 by way of the triode 13 whose anode load impedance 9 is connected across the said terminals. This pulse travels through the line 2 and, following the predetermined delay time, appears at the output terminals 4, following which the previously described sequence of events is repeated cyclically. Pulses may then be derived from the output terminals 4, or from any one of the intermediate terminals 14. The repetition period of the pulses is determined by—and is substantially equal to—the delay time of the line.

The system thus far described, while it will maintain operation once started, is not capable of instituting pulse generation without outside assistance once the system is de-energized. In order to provide means for starting the system, certain starting apparatus, already briefly referred to, has been provided. The principal element of this apparatus is the starting pulse generator 11. The device 11 may conveniently comprise a conventional multivibrator or blocking tube oscillator whose pulse output circuit is coupled to the input terminals 3 of the delay line 2 by way of the starting pulse amplifier 12. It will be observed that the anode load impedance of this amplifier is the impedance 9 which also serves as the anode load impedance for the triode 13. Preferably the repetition rate of the starting pulse generator 11 is low compared to the repetition rate of the pulses generated by the delay line system. Where, as indicated by way of example previously, the delay introduced by the delay line 2 is 125 microseconds, establishing a pulse repetition frequency of approximately 8,000 cycles per second, the pulse repetition rate of the starting pulse generator 11 may be of the order of 400 cycles per second.

Following the application of a starting pulse to the input terminals 3 of the delay line, the system goes into operation in the manner previously described, the pulses being generated by the system comprising elements 2, 6, 7, 8 and 9 at a frequency of approximately 8,000 cycles per second. The rectifier 17, the constants of which may be selected to produce operation of the device as a peak detector, produces a negative voltage across the diode load resistor 15 whose magnitude is determined by the amplitude of the pulses appearing at the output terminals of the pulse generator 7. This negative voltage is applied, by way of the filter 10 and conductor 16, to the starting pulse generator 11 in such manner as to cause the generator 11 to stop oscillating. Where the generator 11 is a multivibrator or a blocking tube oscillator, the conductor 16 may be connected to a control grid of one of the tubes comprising the generator. Any other known and convenient means for preventing the application of starting pulses to the input circuit of the amplifier 12 may, of course, be employed. The details of one specific arrangement suitable for the purpose are disclosed in my above-identified copending application.

From the foregoing it will be seen that, during the normal operation of the pulse generating system, the negative potential developed across the capacitor of the filter 10 acts to prevent the application of starting pulses to the input terminals 3 of the delay line 2. Under these circumstances the pulse repetition rate of the system is determined substantially entirely by the time delay introduced by the delay line 2, the delay occasioned in the amplifier and limiter 6, and in the pulse generator 7 and amplifier 8, being negligible. If, now, for any reason, the system should stop oscillating, the negative bias developed by the pulse rectifier 17 will disappear and the starting pulse generator 11 will be brought into action to start the normal functioning of the system.

When, as described in my above-identified copending application, it is desired to employ the device of the present invention as a generator of keying pulses for use in selecting, sequentially, the various individual communication channels of a multiplex communication system, the desired time-spaced keying pulses may be derived from the taps 14 spaced at intervals along the delay line.

Although I have described my invention with particular reference to one particular illustrated embodiment, it will be evident from the foregoing that the invention is capable of other forms of physical expression.

I claim:

1. In a pulse generating system: a delay line, said delay line having an overall time delay which is long compared to the time duration of the pulses generated by said system; means for generating starting pulses for initiating the operation of said system; means for applying said starting pulses to an input terminal of said delay line; means coupled to an output terminal of said delay line for deriving output pulses therefrom; means for applying said output pulses to an input terminal of said delay line, said pulses being applied in sufficient amplitude to ensure the sustained generation of time-spaced pulses by said system, the repetition rate of the last-named pulses being determined principally by the delay time of said line; and means responsive to the regular generation of pulses for preventing the continued application of starting pulses to said delay line, the last-recited means comprising a pulse rectifier means coupled to a point in the feedback path between said output and input terminals.

2. The combination claimed in claim 1, wherein said means for generating starting pulses comprises a pulse-supplying oscillator whose pulse repetition rate is substantially lower than the pulse repetition rate of said delay line system.

3. In a pulse generating system: a delay line having input and output terminals and having an overall time delay which is long compared to the time duration of the pulses generated by said system; a first pulse generator for initiating the operation of said system, the output of said first pulse generator being applied to an input terminal of said delay line; means coupled to an output terminal of said delay line for deriving output pulses therefrom; a feedback path interconnecting an output terminal and an input terminal of said delay line, said feedback path including a second pulse generator, a pulse amplifier for raising the amplitude of output pulses derived from said output terminal sufficiently to insure sustained generation of time-spaced pulses by said second pulse generator, the repetition rate of the last-named pulses being determined principally by the delay time of said line, and means for applying the output of said second pulse generator to said input terminal; and a control path interconnecting said second pulse generator and said first pulse generator, said control path comprising a pulse rectifier means for deriving a unidirectional control signal from the output pulses of said second pulse generator and means for applying said control signal to said first pulse generator to halt the generation of pulses by said first pulse generator during regular generation of pulses by said second pulse generator.

4. The combination claimed in claim 3, wherein said first pulse generator comprises a pulse-supplying oscillator whose pulse repetition rate is substantially lower than the pulse repetition rate as determined by said delay line.

WILSON P. BOOTHROYD.

REFERENCES CITED

The following references are of record in the file of this patent:

UNITED STATES PATENTS

| Number | Name | Date |
|---|---|---|
| 2,212,173 | Wheeler et al. | Aug. 20, 1940 |
| 2,436,808 | Jacobsen et al. | Mar. 2, 1948 |
| 2,444,782 | Lord | July 6, 1948 |
| 2,447,082 | Miller | Aug. 17, 1948 |